United States Patent [19]

Möckli

[11] Patent Number: 4,510,088
[45] Date of Patent: Apr. 9, 1985

[54] DYE MIXTURES OF ANTHRAQUINONE DYES

[75] Inventor: Peter Möckli, Schönenbuch, Switzerland

[73] Assignee: Ciba Geigy Corporation, Ardsley, N.Y.

[21] Appl. No.: 409,211

[22] Filed: Aug. 18, 1982

[30] Foreign Application Priority Data

Aug. 28, 1981 [CH] Switzerland .......... 5544/81

[51] Int. Cl.³ .......... C07C 97/26; C09B 5/62
[52] U.S. Cl. .......... 260/380; 8/643; 8/678
[58] Field of Search .......... 260/380; 8/643, 678

[56] References Cited

U.S. PATENT DOCUMENTS

| 2,992,240 | 7/1984 | Lodge | 260/380 |
| 3,798,239 | 3/1974 | Genta | 260/380 |
| 3,968,131 | 7/1976 | Maier | 260/380 |
| 4,017,524 | 4/1977 | Kröck et al. | 260/380 |
| 4,036,862 | 7/1977 | Hederich et al. | 260/380 |

FOREIGN PATENT DOCUMENTS 2531557 2/1977 Fed. Rep. of Germany ...... 260/380

2011484 7/1979 United Kingdom ............ 260/380

OTHER PUBLICATIONS

Chemical Abstract, vol. 86, 1977, Hederich et al.

Primary Examiner—Richard L. Raymond
Assistant Examiner—Raymond Covington
Attorney, Agent, or Firm—Roberts Edward McC.

[57] ABSTRACT

Dye mixtures containing at least two dyes of the formula (1)

wherein R is hydrogen, methyl or ethyl, and n is an integer from 2 to 4, exhibit on synthetic textile material a build-up which is considerably better than that of the individual dyes.

9 Claims, No Drawings

DYE MIXTURES OF ANTHRAQUINONE DYES

The present invention relates to dye mixtures containing at least two dyes of the formula (1)

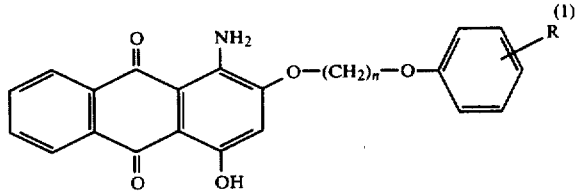

wherein R is hydrogen, methyl or ethyl, and n is an integer from 2 to 4.

The dyes of the above formula (1) wherein n is 2 are known, and are in part used for dyeing polyester material. These dyes have however an unsatisfactory build-up on synthetic textile material, so that it is not possible to obtain dyeings in deep shades.

It was the object of the present invention to overcome this disadvantage, and this was achieved by the use surprisingly of mixtures containing at least two of these dyes. The build-up of these mixtures is considerably better than that obtained using the individual dyes, and the result of this is that, particularly in the case of deep dyeings, the amount of dye left behind in the dye liquor is substantially less.

Preferred dye mixtures according to the invention are those which contain 3 or 4 dyes of the given formula (1).

In the formula (1), n is an integer from 2 to 4; between the two oxygen atoms, there is therefore an ethylene, propylene or butylene bridge. The preferred value of n is 2 or 3.

The mixtures preferred are those containing:
(a) dyes of the formula (1) wherein n is 2, and R is hydrogen or methyl, or R is ethyl arranged in the o- or m-position with respect to the oxygen atom, and/or
(b) dyes of the formula (1) wherein n is 3, and R is hydrogen, or methyl or ethyl, each arranged in the m- or p-position with respect to the oxygen atom.

Particularly preferred mixtures among these are those containing:
(a) dyes of the formula (1) wherein n is 2, and/or
(b) dyes of the formula (1) wherein n is 3,
the meaning of R in both cases being hydrogen, or methyl arranged in the m- or p-position with respect to the oxygen atom.

The quantity ratios in which the individual dyes are present in the mixtures can vary within wide limits. Especially good results are obtained however with mixtures which contain the individual dyes in approximately the same amounts. Accordingly, there are preferred mixtures of 2 dyes of the formula (1), each contained in the mixture to the extent of 40 to 60% by weight, preferably 45 to 55% by weight; as well as mixtures of 3 dyes of the formula (1), each contained in the mixture to the extent of 25 to 50% by weight, preferably 30 to 40% by weight; and mixtures of 4 dyes of the formula (1), each contained in the mixture to the extent of 15 to 40% by weight, preferably 20 to 30% by weight.

Especially preferred on account of the easy availability of the starting compounds, and also by virtue of its good build-up, is the dye mixture consisting of 3 dyes of the formulae (2), (3) and (4)

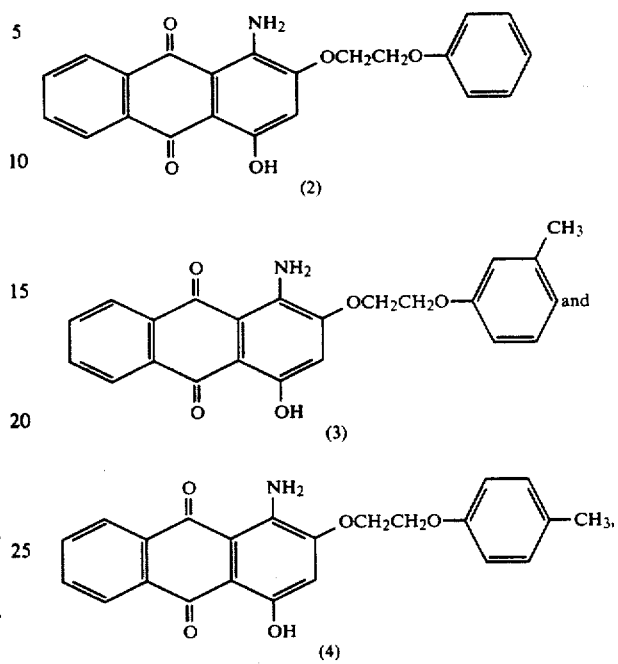

the amount of each of the three components contained in the mixture being 25 to 50% by weight, preferably 30 to 40% by weight.

The dyes of the formula (5)

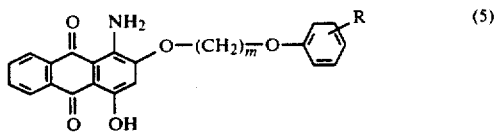

wherein R is hydrogen, methyl or ethyl, and m is 3 or 4, are novel and they form further subject matter of the present invention. The preferred meaning of R is hydrogen, or methyl or ethyl, each of which is arranged in the m- or p-position with respect to the oxygen atom; and it is in particular hydrogen, or methyl arranged in the m- or p-position with respect to the oxygen atom.

The dyes of the formula (1) can be produced by processes known per se, for example by reacting 1-amino-2-phenoxy-4-hydroxyanthraquinone, in the presence of alkali, with a compound of the formula (6)

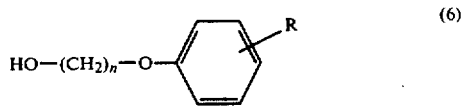

wherein n and R have the meanings given under the formula (1).

A further possibility for producing the dyes of the formula (1) is to react 1-amino-4-hydroxy-2-chloro- or -2-bromoanthraquinone with a compound of the formula (6), in the presence of alkali and phenol, either in an excess of the compound of the formula (6) or in a solvent, such as N-methylpyrrolidone, as described for example in the German Auslegeschrift No. 2,405,782.

Preferably, however, 1-amino-4-hydroxy-2-chloro- or -2-bromoanthraquinone is reacted with a compound of the formula (6) in the presence of alkali and phenol, the reaction being performed in an inert organic solvent and in the presence of a phase-transfer catalyst, especially a quaternary ammonium salt, a phosphonium compound or a crown ether. This procedure is described in the Swiss Patent Application No. 4943/81-9.

The dye mixtures containing at least 2 dyes of the formula (1) are produced for example by a simple mixing or grinding of the dyes.

The preferred method however is to use, in the above-described syntheses of the dyes of the formula (1), mixtures of at least two different compounds of the formula (6), so that mixtures of dyes of the formula (1) are obtained.

In order to obtain dye preparations commercially suitable for dyeing and printing, the dye mixtures according to the invention can be converted into a very finely divided form by customary mechanical processes, optionally in the presence of water, together with suitable dispersing agents and other customary additives.

The dye mixtures are used in particular for dyeing synthetic textile material, especially that made from aromatic polyesters, by known methods.

The following Examples serve to further illustrate the invention. The temperature values are given in degrees Centigrade.

EXAMPLE 1

10 g of each of the dyes produced in the manner described in the following are mixed together in the dry state to obtain a homogeneous mixture.

(a) 47.3 g of 2-phenoxyethanol, 3.5 g of phenol, 6.9 g of potassium carbonate and 10.4 g of 1-amino-2-chloro-4-hydroxyanthraquinone are mixed together at 160° C. for about 15 hours. After the mixture has cooled to 100° C., 31.5 g of methanol are carefully added dropwise; the mixture is subsequently cooled to 40° C. and then filtered by suction. The product obtained is afterwards washed with methanol and finally with water and is then dried. The yield is 12.4 g of the dye of the formula (2)

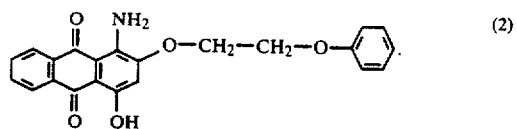

(b) When the procedure is carried out as described under (a) except that 52.1 g of 2-(m-cresoxy)-ethanol are used in place of 47.3 g of 2-phenoxyethanol, there are obtained 11.6 g of the dye of the formula (3)

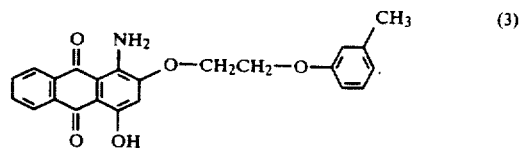

(c) When the procedure is carried out as described under (a) except that 52.1 g of 2-(p-cresoxy)-ethanol are used instead of 47.3 g of 2-phenoxyethanol, there are obtained 12.6 g of the dye of the formula (4)

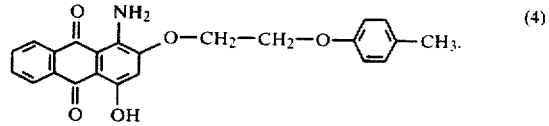

The employed 2-(m-cresoxy)-ethanol was produced as follows: 30.3 g of ethylenechlorohydrin are added in controlled amounts to a solution at 90° C. consisting of 40.5 g of m-cresol and 52.4 g of 30% aqueous sodium hydroxide solution, and the mixture is subsequently refluxed for 2 hours. After a layer separation at room temperature, the organic phase is distilled in vacuo. The yield is 51.2 g of 2-(m-cresoxy)-ethanol (b.p. 132°-135° C. at 10 Torr).

2-(p-Cresoxy)-ethanol is obtained by an analogous procedure with the use of p-cresol.

EXAMPLE 2

20.3 g of 2-(p-cresoxy)-ethanol, 20.3 g of 2-(m-cresoxy)-ethanol, 6.8 g of phenol, 13.5 g of potassium carbonate and 10.4 g of 1-amino-2-chloro-4-hydroxyanthraquinone are stirred together at 160° C. for 8 hours. After the mixture has cooled to 100° C., 28.4 g of methanol are carefully added dropwise; the mixture is then cooled to room temperature and subsequently filtered with suction. The yield after washing the product with methanol and water and drying is 9.7 g of a 1:1 mixture of 1-amino-4-hydroxy-2-(2'-p-cresoxy)-anthraquinone and the corresponding m-cresoxy derivative.

EXAMPLE 3

82.8 g of a mixture of 2-phenoxyethanol, 2-(p-cresoxy)-ethanol and 2-(m-cresoxy)-ethanol in the molar ratio of 1:1:1 are stirred together with 6.9 g of phenol, 13.8 g of potassium carbonate and 10.4 g of 1-amino-2-chloro-4-hydroxyanthraquinone for 6 hours at 160° C. After the mixture has cooled to 100° C., 28.9 g of methanol are carefully added dropwise; the mixture is subsequently cooled to room temperature and filtered under suction. The yield after washing the product with methanol and water and drying is 10.9 g of a dye mixture containing, in approximately equal amounts, the three dyes:

1-amino-4-hydroxy-2-(2'-phenoxyethoxy)-anthraquinone,
1-amino-4-hydroxy-2-(2'-m-cresoxyethoxy)-anthraquinone, and
1-amino-4-hydroxy-2-(2'-p-cresoxyethoxy)-anthraquinone.

EXAMPLE 4

30.1 g of 1-amino-2-chloro-4-hydroxyanthraquinone (titer 91%), 30 ml of nitrobenzene, 5 g of methyltrioctylammonium chloride, 10.4 g of phenol, 13.2 g of potassium carbonate, a mixture of 15.2 g of 2-phenoxyethanol, 16.7 g of 2-(m-cresoxy)-ethanol and 16.7 g of 2-(p-cresoxy)ethanol are heated to 150° C., and are stirred at 150° to 153° C. for 8 hours. To the mixture are added 95 ml of methanol; the mixture is then filtered at room temperature, washed with methanol and water and dried. The yield is 33.35 g (86.8% of theory) of a dye mixture consisting of three pure components, namely:

1-amino-4-hydroxy-2-(2'-phenoxyethoxy)-anthraquinone, 1-amino-4-hydroxy-2-[2'-(m-cresoxyethoxy)]-anthraquinone and 1-amino-4-hydroxy-2-[2'-(p-cresoxyethoxy)]-anthraquinone.

EXAMPLE 5

67.1 g of 3-(m-cresoxy)-propanol, 3.0 g of potassium hydroxide and 12.6 g of 1-amino-2-phenoxy-4-hydroxyanthraquinone are mixed together firstly for 18 hours at 150° C. and then for 14 hours at 170° C. After the mixture has cooled to 80° C., 66.7 g of methanol are added dropwise; the mixture is subsequently cooled to room temperature, filtered with suction and then washed with methanol. The residue is recrystallised from 600 g of chlorobenzene. The yield after drying is 5.5 g of the dye of the formula

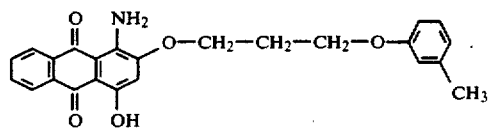

The employed 3-(m-cresoxy)-propanol was produced as follows: 108 g of 1,3-cresol are dissolved in 500 g of 10% aqueous sodium hydroxide solution. There are added 95.6 g of 3-chloro-1-propanol, and the mixture is then refluxed for 2 hours. The mixture is subsequently cooled, and the yield after layer separation is 148 g of 3-(m-cresoxy)-propanol.

10 g of this dye, with the addition of 5 parts of a condensation product of a naphthalenesulfonic acid with formaldehyde in 60 parts of water, are ground by means of a glass-bead mill until a sufficiently fine division of the particles is obtained. 15 parts of an oxylignin sulfonate are subsequently added, and the mixture is dried in a spray dryer. There is thus obtained a dye preparation which gives a fully satisfactory dispersion in water, and which is suitable for dyeing polyester.

EXAMPLE 6

There is prepared a dye liquor of 250 ml, which contains:

0.24 g of the dye mixture according to Example 1,
0.25 g of anionic and nonionic tensides,
0.05 g of ammonium sulfate, and
0.025 ml of 85% formic acid.

10 g of Diolen staple fabric is dyed with this liquor, in the customary manner, at 130° C. by the HT exhaust process. The fabric is subsequently rinsed hot and cold and then subjected to reductive cleaning. There is obtained a polyester fabric dyed red, which is dyed in a depth of shade of more than 2/1 standard depth of shade.

If there is used however, instead of 0.24 g of the above dye mixture containing the dyes of the formulae (2), (3) and (4) in equal amounts, 0.24 g of the individual dyes of the formula (2), (3) or (4), dyeings in only 1/1 to 5/4 standard depth of shade are obtained, that is to say, with the same amount of dye, the dyeings obtained are only about half as intense:

The table below shows the residual amounts of dye remaining in the dye bath in the case of the dyeings described above:

| Dye | Residual amount in bath |
| --- | --- |
| (2) | 47% |
| (3) | 41% |
| (4) | 46% |
| mixture of (3) + (4) [1:1] | 19% |
| mixture of (2) + (3) + (4) [1:1:1] | 6% |

What is claimed is:

1. A dye mixture consisting of at least two dyes of the formula (1)

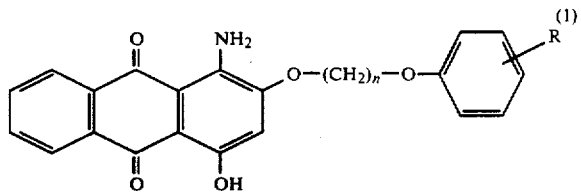

wherein R is hydrogen, methyl or ethyl, and n is an integer from 2 to 4.

2. A dye mixture of claim 1, consisting of 3 or 4 dyes of the given formula (1).

3. A dye mixture according to claim 1 or 2, consisting of dyes of the formula (1) wherein n is 2 or 3.

4. A dye mixture according to claim 1 or 2, which mixture consists of:

(a) dyes of the formula (1) wherein n is 2, and R is hydrogen or methyl, or R is ethyl arranged in the o- or m-position with respect to the oxygen atom, and/or (b) dyes of the formula (1) wherein n is 3, and R is hydrogen, or methyl or ethyl, each arranged in the m- or p-position with respect to the oxygen atom.

5. A dye mixture according to claim 4, which consists of:

(a) dyes of the formula (1) wherein n is 2, and/or (b) dyes of the formula (1) wherein n is 3, wherein R in both cases is hydrogen, or methyl arranged in the m- or p-position with respect to the oxygen atom.

6. A dye mixture according to claim 1, which consists of a mixture of 2 dyes of the formula (1), each contained in the mixture to the extent of 40 to 60% by weight.

7. A dye mixture according to claim 1 which consists of a mixture of 3 dyes of the formula (1), each contained in the mixture to the extent of 25 to 50% by weight.

8. A dye mixture according to claim 1, which consists of a mixture of 4 dyes of the formula (1), each contained in the mixture to the extent of 15 to 40% by weight.

9. A dye mixture according to claim 7, which consists of the 3 dyes of the formulae (2), (3) and (4)

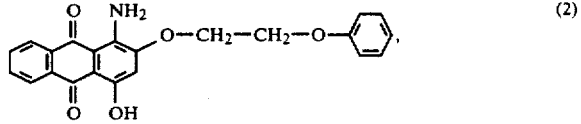

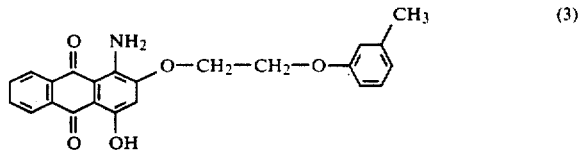

-continued
and
-continued
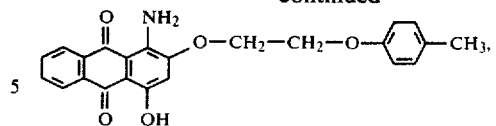
(4)
the amount of each of the three components contained in the mixture being 25 to 50% by weight.
* * * * *